G. GORDON & C. A. GARRETT.
WATER BAG HOLDER.
APPLICATION FILED JAN. 9, 1917.
1,294,653.
Patented Feb. 18, 1919.
2 SHEETS—SHEET 1.
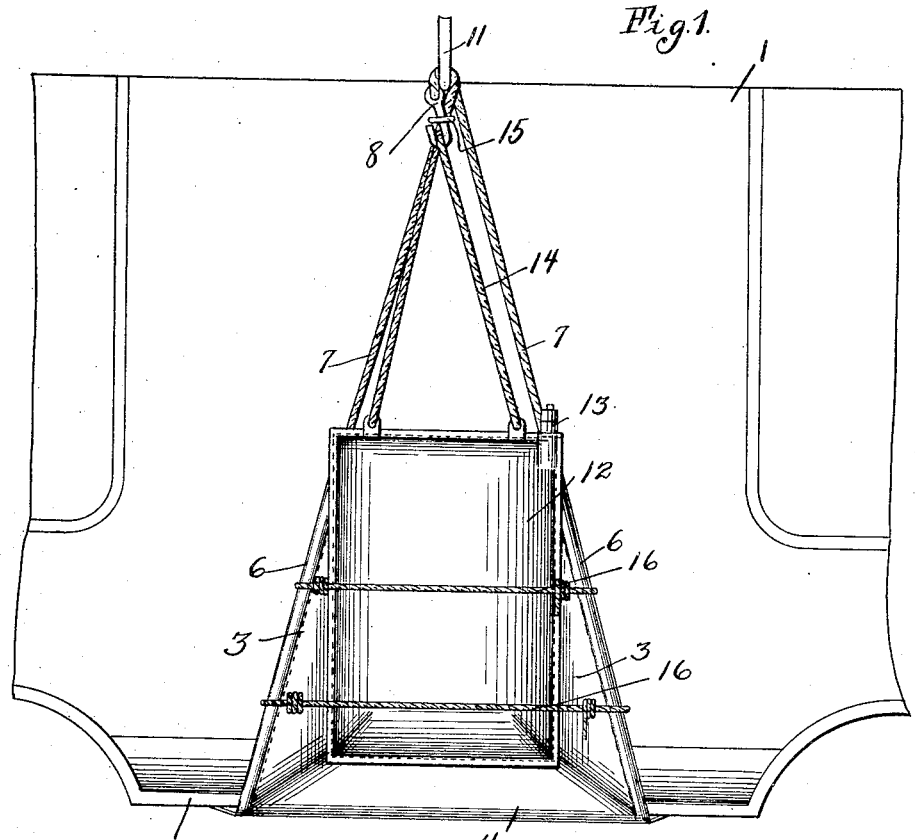
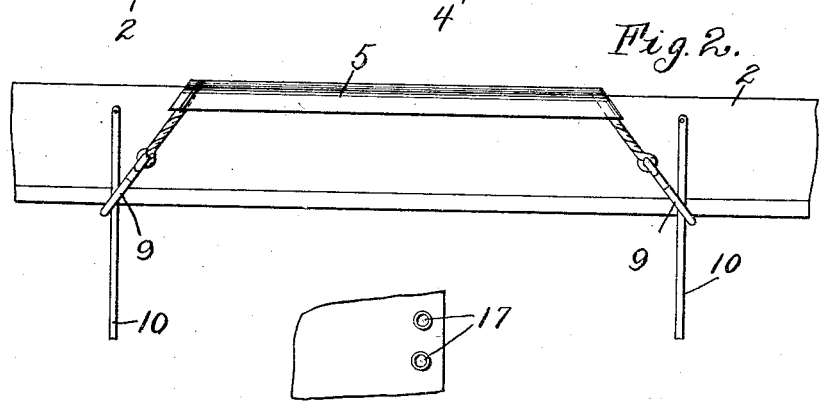
WITNESSES
Arthur K Moore
J. P. Campbell
INVENTOR
Gurney Gordon
Clyde A. Garrett
ATTORNEY

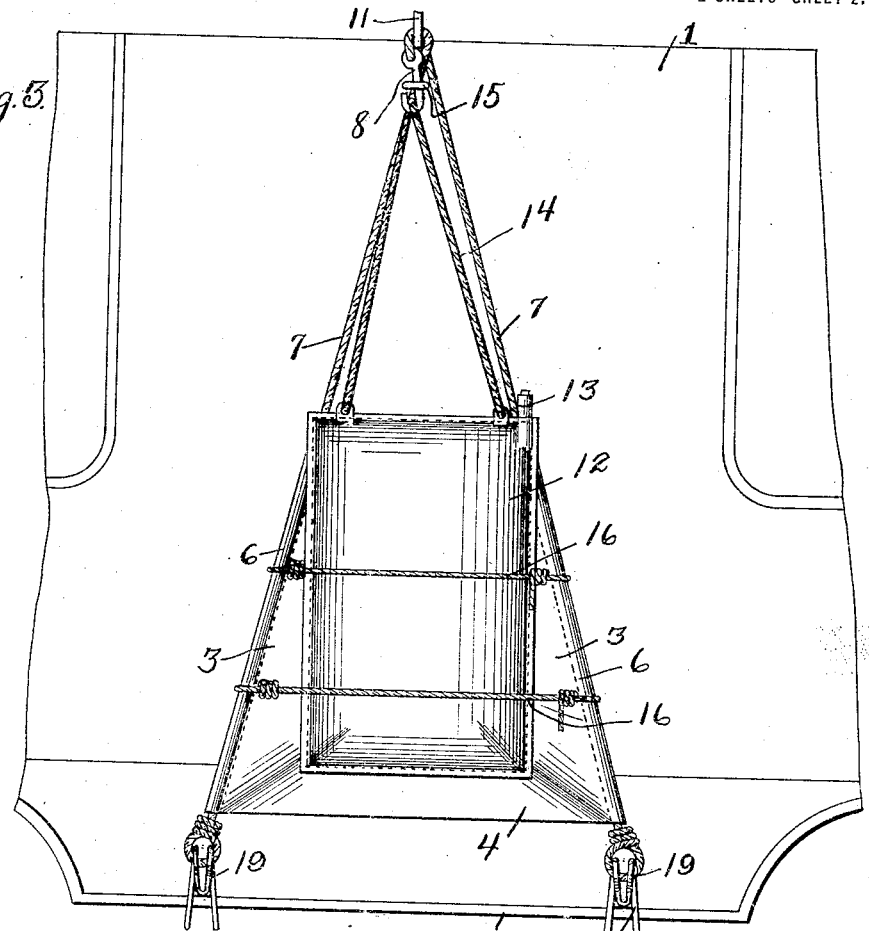
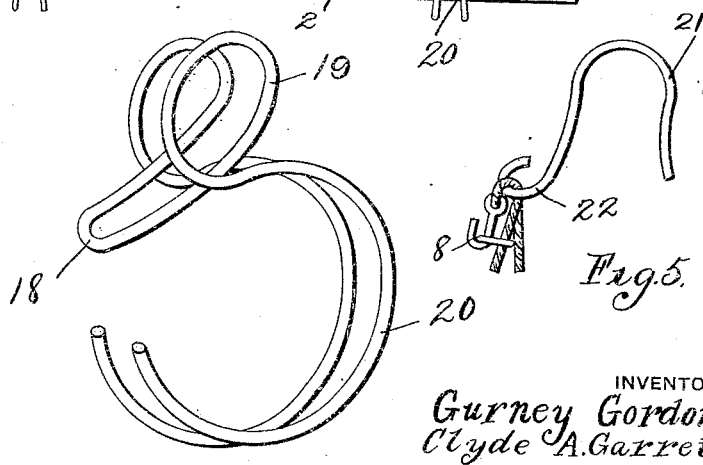

UNITED STATES PATENT OFFICE.

GURNEY GORDON AND CLYDE A. GARRETT, OF RENO, NEVADA.

WATER-BAG HOLDER.

1,294,653.     Specification of Letters Patent.     Patented Feb. 18, 1919.

Application filed January 9, 1917. Serial No. 141,434.

*To all whom it may concern:*

Be it known that we, GURNEY GORDON and CLYDE A. GARRETT, citizens of the United States, residing at Reno, in the county of Washoe and State of Nevada, have invented certain new and useful Improvements in Water-Bag Holders, of which the following is a specification.

Our invention relates to new and useful improvements in an attachment for automobiles, and more particularly to a water bag holder.

The primary object of the invention is to provide a device of the above character for holding a water bag on an automobile in such a position that it will be exposed to the air whereby the water contained therein will be cooled.

A further object of the invention is to provide means whereby the water bag may be released so that the contents thereof may be discharged when desired.

A still further object of the invention is to provide means whereby the holder may be easily connected to or disconnected from automobiles of various makes.

With these and other objects in view the invention consists in the novel details of construction and arrangement of parts which will be more clearly understood from the following description and drawings, in which—

Figure 1 is a fragmental side elevation of an automobile body, showing our holder in position thereon, Fig. 2 is a fragmental bottom view of an automobile body, showing the bottom of our improved holder attached in position, Fig. 3 is a fragmental side elevation of an automobile body, showing a modified form of holder in position thereon, Fig. 4 is a perspective of one of the attaching hooks used on the modified form of holder, Fig. 5 is a side view of one of our attaching hooks showing a corner of the holder, and Fig. 6 is a fragmentary perspective of a portion of the body showing the eyes formed therein.

In Figs. 1 and 2 of the drawings, we have illustrated the preferred form of our invention and in these views, 1 indicates the body of an automobile of any desired make and having the usual running board 2. Our improved holder may be made of any desired flexible material and is adapted to be secured to the side of the automobile body. It comprises a flat back 5 adapted to contact with the body of an automobile, two triangular side panels 3, and an outwardly inclined bottom 4, said bottom 4 in some instances, being adapted to be bent beneath the running board as indicated in Fig. 2 of the drawings, and the purpose of which will be presently described. The front edges of the sides are bent upon themselves and secured in position so as to form beads or channels 6 through which a rope 7 is adapted to pass. A hook 8 is secured to the bend at the upper portion of the rope 7, and hooks 9 are secured to the lower ends of the rope and are adapted to engage the braces 10 on the underside of the automobile. When in use the upper end of the rope 7 is adapted to be passed around one of the vertical uprights of the automobile top, as indicated at 11. A ring 15 is carried on the rope 7 and the hook 8 is adapted to pass therethrough.

The water bag is indicated at 12 and is provided with the usual filling and discharge opening and its plug, as indicated at 13. A rope 14 is secured to the bag and is adapted to be engaged by the hook 8, as illustrated in Fig. 1 of the drawings. Ropes 16 are secured to the sides 3 and extend across the outer face of the water bag so that the same is securely held within the holder and against the back thereof. The sides 3 are provided with the eyelets 17 through which the ends of the cross ropes 16 pass for securing them to the sides, and these ropes 16 hold the sides in the position illustrated in Fig. 1 of the drawings.

In Fig. 3 we have shown a slightly modified form of our holder which is adapted to be used on those automobiles which do not have the under brace rods to which the hook might be secured. In this form of our invention, means are provided for securing the lower portion of the holder to the edge of the running board. In the modified form of the invention the body portion of the holder and the water bag as well as the upper attaching hook, are of the same construction as described in the preferred form of the invention. In the modified form, instead of providing the hooks 9 for engaging the brace rods, we use a hook of the construction more particularly illustrated in Fig. 4 of the drawings. This hook is formed from a single piece of wire bent to form an extension 18, eyes 19 and hook-arms 20. It will be seen that by providing the eyes 19 the hooks will be of a spring character whereby they will be allowed to yield in applying them to the running board, but will securely grasp the running board to hold the device in position. The ends of the hook member 20 will be under the running board and the extension 18 will engage the top surface thereof. The rope 7 is adapted to be secured to the eyes 19, as is more particularly illustrated in Fig. 3 of the drawings.

In Fig. 5 of the drawings we have illustrated a hook which is particularly adapted for securing the top of the holder when the so-called "one man top" for automobiles is used. This hook comprises the bill 21 and eye 22. When in use the bill 21 may be engaged over the top of the automobile body or any suitable member and the upper end of the rope 7 will be passed through the eye 22, as illustrated in Fig. 5. The hook 8 will then pass through the ring 15 on the rope 7 and receive the rope on the water bag. The body of this holder, as stated above, may be of flexible material, and the supporting ropes 7 hold it distended so that with or without the bag being in place, rain, snow or mud spattering into the same will run out over the outwardly inclined bottom 4. By making the side panels 3 triangular, their upper portions lie close to the body of the machine, or in other words their beaded edges 6 incline inward from the outer edge of the running board so that there is the least likelihood of striking adjacent objects such as twigs and bushes along the roadside. While we have described this device as a bag holder, it is obvious that other articles than water bags might be placed therein, and for this purpose it may be necessary to let out the cross ropes, 16 as is of course possible. Particular attention is invited to the double function performed by the hook 8. It serves for fastening the bend of the supporting rope over the upright 11 of the auto top, and it serves also to receive the bend of the bag-rope 14, the ring 15 acting as a keeper.

When it is desired to discharge the contents or a portion thereof from the bag, the bag may be unhooked from hook 8 and raised from behind the ropes 16. After the desired amount has been discharged it may be again placed in position. By constructing our device as described it will be seen that it is not necessary to remove the holder every time it is desired to discharge a portion of the contents of the bag.

When a water bag is carried in the position illustrated the water contained therein will be cooled by the air contacting with the bag, and will not flow against the side of the car and mar or defect the paint and will keep the running board dry.

Having thus fully described our invention, what we claim as new and desire to secure by Letters Patent is:

A water bag holder for automobiles comprising a flat upright back, two triangular side panels extending forward from the edges of said back and beaded along their front edges, and an outwardly inclined bottom connecting the lower edges of said panels, the latter having eyelets near their beads, cross ropes connecting opposite eyelets for holding a bag removably in place, a supporting rope bent at its center with its two stretches led downward through said beads and adapted to be connected at their lower ends with the running board, a hook at the vent center, the latter adapted to be attached to the automobile body, and another rope for supporting the bag, this rope adapted for detachable engagement with said hook when the bag rests on said bottom behind said cross ropes.

In testimony whereof we affix our signatures in presence of two witnesses.

GURNEY GORDON.
CLYDE A. GARRETT.

Witnesses:
L. A. GIBBONS,
HENRY M. HOYT.

Copies of this patent may be obtained for five cents each, by addressing the "Commissioner of Patents, Washington, D. C."